US007456781B2

(12) United States Patent
Honda

(10) Patent No.: US 7,456,781 B2
(45) Date of Patent: Nov. 25, 2008

(54) RADAR

(75) Inventor: Kanako Honda, Hyogo (JP)

(73) Assignee: Fujitsu Ten Limited, Kobe-Shi (JP)

( * ) Notice: Subject to any disclaimer, the term of this patent is extended or adjusted under 35 U.S.C. 154(b) by 21 days.

(21) Appl. No.: 11/366,763

(22) Filed: Mar. 3, 2006

(65) Prior Publication Data

US 2006/0208940 A1    Sep. 21, 2006

(30) Foreign Application Priority Data

Mar. 4, 2005    (JP)    ............................. P2005-060275

(51) Int. Cl.
*G01S 7/40*    (2006.01)
*G01S 7/35*    (2006.01)
*G01S 13/34*    (2006.01)
*G01S 13/00*    (2006.01)
*G01S 13/93*    (2006.01)

(52) U.S. Cl. ........................... 342/173; 342/27; 342/70; 342/118; 342/128; 342/165; 342/175; 342/195

(58) Field of Classification Search .................. 342/27, 342/28, 70–72, 82–103, 165–175, 195, 198, 342/200–205, 73–81, 118, 128–133, 192–194, 342/196, 197; 180/167–169; 701/300, 301
See application file for complete search history.

(56) References Cited

U.S. PATENT DOCUMENTS 4,106,016 A * 8/1978 Cerra et al. .................... 342/77

| | | | | |
|---|---|---|---|---|
| 5,274,380 A * | 12/1993 | Yatsuka et al. | ................. | 342/70 |
| 5,945,941 A * | 8/1999 | Rich et al. | ................... | 342/201 |
| 6,664,919 B2 * | 12/2003 | Isaji | ............................ | 342/70 |
| 6,856,283 B2 * | 2/2005 | Jacobson et al. | ............ | 342/175 |
| 6,963,302 B2 * | 11/2005 | Arvidsson | .................... | 342/175 |
| 7,002,512 B2 * | 2/2006 | Isaji | ............................ | 342/200 |
| 7,183,968 B2 * | 2/2007 | Isaji | ............................ | 342/70 |
| 7,221,309 B2 * | 5/2007 | Isaji | ............................ | 342/70 |

FOREIGN PATENT DOCUMENTS

JP    A 2001-091631    4/2001

* cited by examiner

*Primary Examiner*—Bernarr E Gregory
(74) *Attorney, Agent, or Firm*—Oliff & Berridge, PLC

(57) ABSTRACT

A radar includes a transmission section, a heterodyne reception section, a power supply section and a detection section. The transmission section emits a transmission wave to a target. The heterodyne reception section receives a reflected wave from the target. The power supply section supplies power to the reception section. A switching frequency of the power supply section is in synchronization with a local oscillation frequency of the reception section. The detection section determines that the switching frequency is out of synchronization with the local oscillation frequency when a certain peak frequency existing in an output signal of the reception section before a transmission state of the transmission section is changed still exists in the output signal of the reception section after the transmission state of the transmission section is changed.

12 Claims, 11 Drawing Sheets

RADAR

CROSS-REFERENCE TO RELATED APPLICATIONS

This application is based upon and claims the benefit of priority from Japanese Patent Application No. 2005-60275 filed on Mar. 4, 2005, the entire contents of which are incorporated herein by reference.

BACKGROUND

1. Field of the Invention

This invention relates to a radar and in particular to a radar, which can suppress influence of noise caused by a power source for supplying drive power and check if the radar operates normally.

2. Description of the Related Art

In recent years, to improve safety during an automobile running, the number of automobiles each equipped with an FM-CW radar, which can detect distance to a vehicle running ahead of the automobile and relative speed between the vehicle running ahead and the automobile, has grown. The FM-CM radar transmits a frequency-modulated continuous wave forward, receives wave reflected by a vehicle to be detected, and detects the distance to the vehicle running ahead of the automobile and the relative speed between the vehicle running ahead and the automobile based on beat wave obtained by mixing the transmission wave and the reception wave.

Since the vehicle-installed radar as described above uses a battery as a power supply, a so-called DC-DC converter is generally provided for the power supply to provide power of various voltages required for the radar. The DC-DC converter once converts DC power of a predetermined voltage supplied from the battery into AC power and changes the voltage of the AC power by a transformer and then again converts the AC power into DC power of a necessary voltage. In order to control a switching element of an inverter, an oscillator for generating switching signals is required. In many cases, the fundamental wave of the switching signals or the harmonic of the switching signals exists in a 1-MHz band.

However, signals of an intermediate frequency circuit of a reception section of the radar are usually in the 1-MHz band. Therefore, the fundamental wave of the switching signals or the nth-order harmohic of the switching signals of the DC-DC converter may be superimposed on the intermediate-frequency signals as noises. FIG. 1 is a block diagram of a radar according to a related art. The radar includes a radar section 1, a DC-DC converter 15, and a switching signal oscillator 16.

The radar section 1 includes a transmission section 10 for generating a transmission wave, a heterodyne reception section 11 for extracting a baseband signal from a reception wave, a data processing section 12 for extracting information from the baseband signal, and an antenna 13 for radiating the transmission wave output from the transmission section 10 and receiving wave reflected by an object to be detected. The reception section 11 includes a high-frequency amplification section 110 for amplifying the reflected wave received at the antenna 13, a local oscillator 112 for converting into an intermediate frequency, an intermediate-frequency signal generation section 113 for mixing output of the high-frequency amplification section 110 and output of the local oscillator 112 to generate an intermediate-frequency signal, an intermediate-frequency signal amplification section 114 for amplifying the intermediate-frequency signal, and a detection section 115 for extracting the baseband signal.

FIGS. 2A and 2B are signal spectral drawings (No. 1). FIG. 2A shows the spectrum of the input signal of intermediate frequency generation section and FIG. 2B shows the spectrum of the output signal of the intermediate frequency generation section. That is, in the spectrum of the input signal of the intermediate frequency generation section, spectrum of $f_{DD} \times n$ (n=1, 2 . . . ), which is the fundamental wave or harmonic of the switching signal of the DC-DC converter (noise), exists in a band of frequency $f_{SW} \pm f_t$, which is determined based on the upper limit of the detection range of the radar and has oscillation frequency $f_{SW}$ of the local oscillator 112 as its center.

Here, the frequency $f_t$ is a half of a sampling frequency, which is used when the baseband signal output from the detection section 115 is sampled and input into the data processing section 12. The frequency $f_t$ is determined based on the upper limit of the detection range of the radar. In the spectrum of the output signal of the intermediate frequency generation section, noise spectrum ($f_{DD} \times n - f_{SW}$) exists between frequency band DC and $f_t$.

In this case, it is inevitable that the radar will recognize the frequency of the noise component as a detection object although not actually exist and will provide a user with erroneous information.

Then, to solve the above-described problem, JP 2001-91631 discloses a radar, which does not output erroneous information caused by a DC-DC converter and checks if the radar operates normally.

That is, in the radar according to JP 2001-91631, the DC-DC converter 15 is excited by an output signal (local oscillation frequency) of the local oscillator 112. Thereby, frequency of the nth-order harmonic of the switching frequency $f_{DD}$ of the DC-DC converter 15, that is, $f_{DD} \times n$ (n=1, 2 . . . ), is set to be identical with the local oscillation frequency $f_{SW}$ of the local oscillator 112, to thereby suppress occurrence of noise caused by the nth-order harmonic of the switching frequency of the DC-DC converter 15.

SUMMARY OF THE INVENTION

In JP 2001-91631, the output signal of the local oscillator 112 is input to the DC-DC converter 15 as a drive signal as described above. However, if the signal line between the local oscillator 112 and the DC-DC converter 15 is broken, the output signal of the local oscillator 112 is not input to the DC-DC converter 15 and the local oscillation frequency of the local oscillator 112 and the switching frequency of the DC-DC converter 15 are out of synchronization with each other. Thus, if the local oscillator 112 and the DC-DC converter 15 are out of synchronization with each other, the DC-DC converter 15 free runs (operates at a predetermined frequency different from the local oscillation frequency of the local oscillator 112) and noise occurs. If anomaly occurs in the DC-DC converter 15 and the switching frequency of the DC-DC converter 15 becomes different from the local oscillation frequency of the local oscillator 112, likewise the DC-DC converter 15 and the local oscillator 112 become out of synchronization with each other, the DC-DC converter 15 free runs and noise occurs.

The invention provides a radar, which can detect that a DC-DC converter and a local frequency oscillator are out of synchronization with each other when the DC-DC converter and the local oscillator become out of synchronization with each other due to some cause.

According to a first aspect of the invention, a radar includes a transmission section, a heterodyne reception section, a power supply section and a detection section. The transmission section emits a transmission wave to a target. The heterodyne reception section receives a reflected wave from the target. The power supply section supplies power to the reception section. A switching frequency of the power supply section is in synchronization with a local oscillation frequency of the reception section. The detection section determines that the switching frequency is out of synchronization with the local oscillation frequency when a certain peak frequency existing in an output signal of the reception section before a transmission state of the transmission section is changed still exists in the output signal of the reception section after the transmission state of the transmission section is changed.

For example, the change of the transmission state may contain change of the modulation frequency of the transmission wave, switching of modulation of the transmission wave, or stop of the transmission wave.

According to a second aspect of the invention, a radar includes a heterodyne reception section, a power supply section and a detection section. The reception section receives a reflected wave from a target. The power supply section supplies power to the reception section. A switching frequency of the power supply section is in synchronization with the local oscillation frequency. The detection section determines that the switching frequency is out of synchronization with the local oscillation frequency, when a certain peak frequency, which exists in an output signal of the reception section before the local oscillation frequency is changed or stopped without changing the switching frequency, still exists in the output signal of the reception section after the local oscillation frequency is changed or stopped without changing the switching frequency.

According to a third aspect of the invention, a radar includes a heterodyne reception section, a power supply section and a detection section. The reception section receives a reflected wave from a target. The power supply section supplies power to the reception section. A switching frequency of the power supply section is in synchronization with the local oscillation frequency. The detection section determines that the switching frequency is out of synchronization with the local oscillation frequency when a certain peak frequency has existed in an output signal of the reception section over a predetermined time period.

When it is determined that the local oscillation frequency and the switching frequency are out of synchronization with each other, the certain peak frequency may be canceled and the target may be detected.

According to the above configurations, the state in which the power supply section (DC-DC converter) and the local oscillator are out of synchronization with each other can be detected. Accordingly, the presence of a noise spectrum can be recognized and output of erroneous information can be prevented.

DETAILED DESCRIPTION OF EMBODIMENTS OF THE INVENTION

Referring now to the accompanying drawings, embodiments of the invention will be described below. It is noted that the specific embodiments described below does not limit the scope of the invention.

Figure 1:
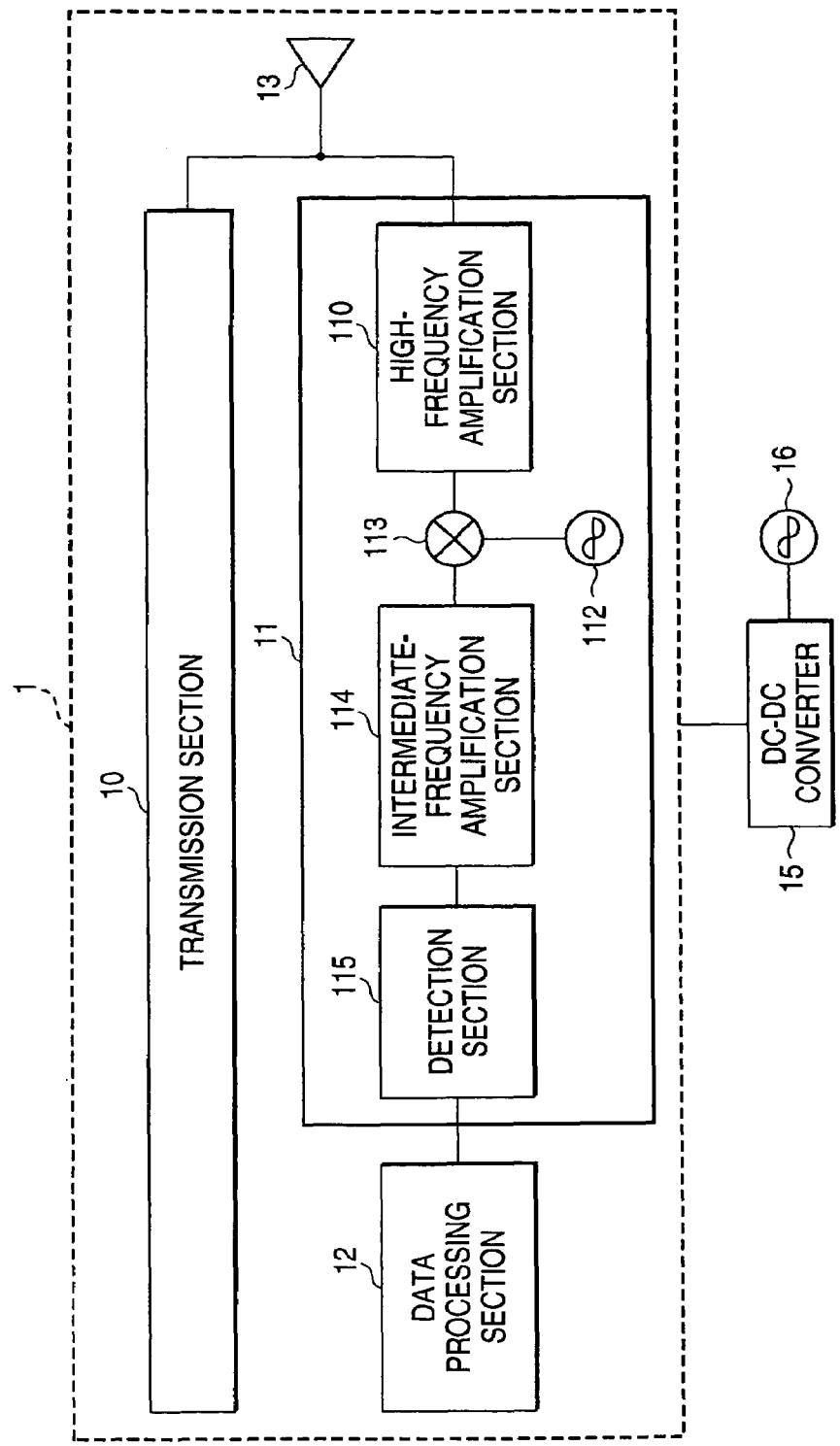
FIG. 1 is a block diagram of a radar according to a related art.
Figure 3:
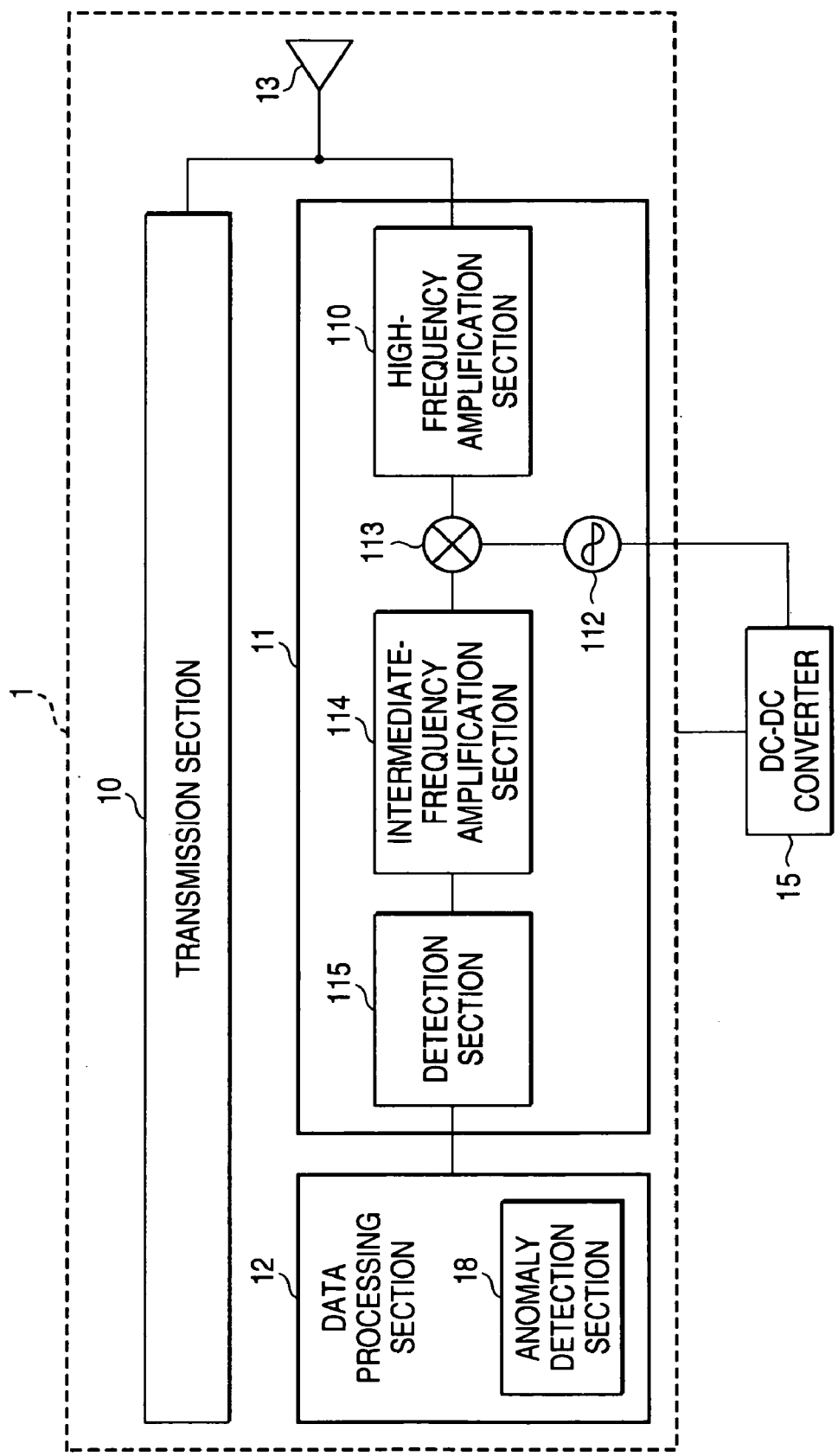
FIG. 3 is a block diagram of a radar according to an embodiment of the invention.

FIG. 3 is a block diagram of a radar according to an embodiment of the invention. The radar includes a radar section 1 and a DC-DC converter (power supply) 15 like the radar according to the related art shown in FIG. 1, but does not include a switching signal oscillator 16. The radar section 1 includes a transmission section 10, a heterodyne reception section 11, a data processing section 12, an antenna 13 and an anomaly detection section 18. The transmission section 10 generates and transmits an FM-modulated continuous wave. The heterodyne reception section 11 extracts a baseband signal from a reception wave of a reflected wave. The data processing section 12 extracts information from the baseband signal. The antenna 13 radiates the transmission wave output from the transmission section 10 and receives wave reflected by an object to be detected. The anomaly detection section 18 may be included in the data processing section 12. Alternatively, the anomaly detection section 18 may be separate from the data processing section 12.

The reception section 11 includes a high-frequency amplification section 110, a local oscillator 112, an intermediate-frequency signal generation section 113, an intermediate-frequency signal amplification section 114 and a detection section 115. The high-frequency amplification section 110 amplifies the reflected wave received at the antenna 13. The local oscillator 112 generates a conversion signal used in converting into an intermediate frequency. The intermediate-frequency signal generation section 113 mixes an output of the high-frequency amplification section 110 and an output of the local oscillator 112 to generate an intermediate-frequency signal. The intermediate-frequency signal amplification section 114 amplifies the intermediate-frequency signal. The detection section 115 extracts the baseband signal.

The DC-DC converter 15 is excited by an output of the local oscillator 112. A frequency dividing section (not shown) for dividing oscillation frequency $f_{SW}$ of the local oscillator 112 into one-$n_{th}$ of $f_{SW}$ may be inserted between the local oscillator 112 and the DC-DC converter 15 depending on switching frequency $f_{DD}$ of the DC-DC converter 15 and the oscillation frequency $f_{SW}$ of the local oscillator 112.

Figure 4A:
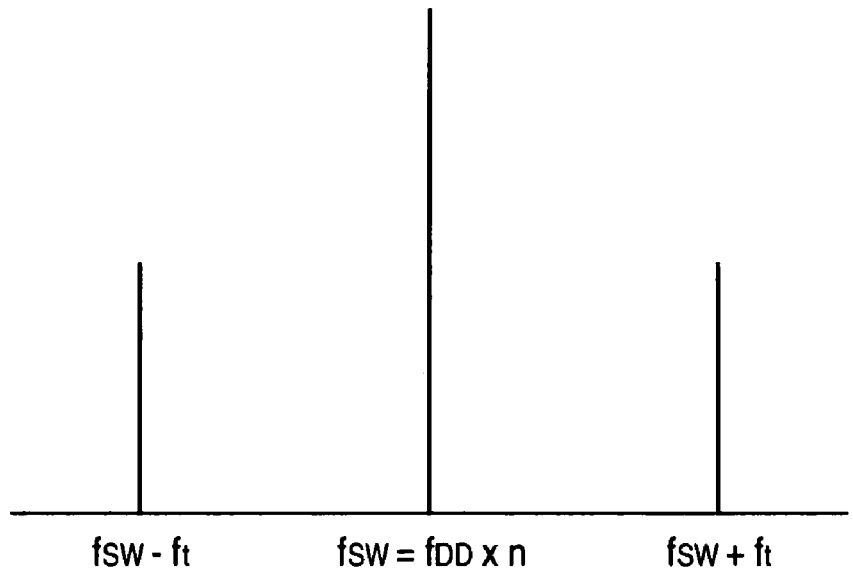
FIGS. 4A and 4B are signal spectral drawings (No. 2)
Figure 4B:
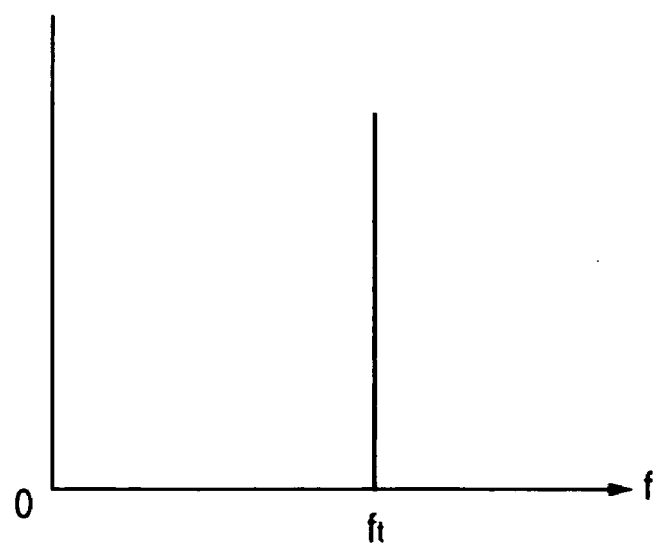

According to this embodiment, $f_{DD} \times n = f_{SW}$. That is, frequency of nth-order harmonic of the switching frequency $f_{DD}$ of the DC-DC converter 15 ($f_{DD} \times n$) is equal to the oscillation frequency $f_{SW}$ of the local oscillator 112 as shown in a signal spectral drawing (NO. 2) of FIG. 4A. Therefore, noise caused by the nth-order harmonic of the switching frequency of the DC-DC converter 15 does not occur in frequency band of the output signal of the intermediate-frequency signal generation section 113 from zero to $f_r$ (where $f_r$ is the frequency determined to correspond to the maximum detection range of the radar). Also, erroneous information caused by the DC-DC converter 15 is prevented from being output.

According to another embodiment, the DC-DC converter 15 may be excited by a dedicated switching signal oscillator 16. Oscillation frequency $f_{DD}$ of the dedicated switching signal oscillator 16 may be set so that $f_{DD} \times n = f_{SW}$ or $f_{DD} > f_{SW} + f_r$.

Figure 5A:
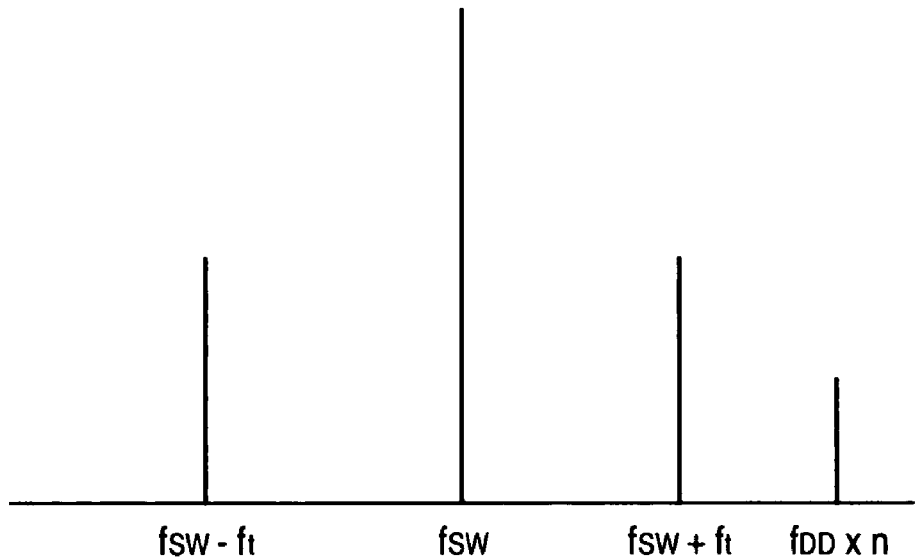
FIGS. 5A and 5B are signal spectral drawings (No. 3)
Figure 5B:
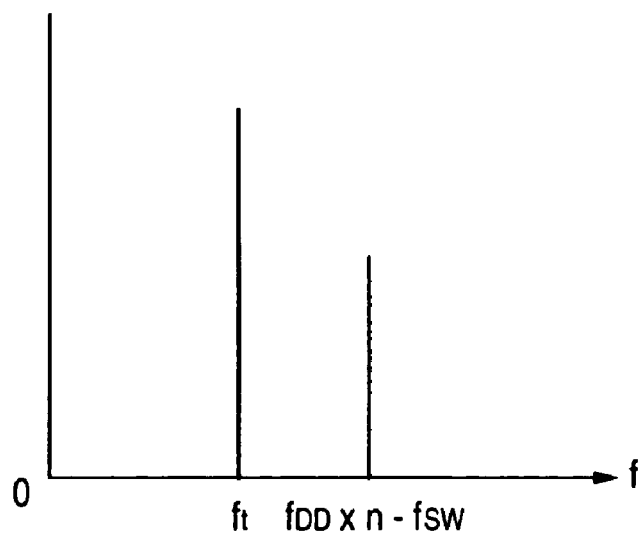

In the former case, the frequency of the nth-order harmonic of the switching frequency $f_{DD}$ of the DC-DC converter 15 ($f_{DD} \times n$) is equal to the oscillation frequency $f_{SW}$ of the local oscillator 112. In the latter case, difference frequency ($f_{DD} \times n - f_{SW}$) obtained by subtracting the oscillation frequency $f_{SW}$ of the local oscillator 112 from the frequency of the nth-order harmonic of the switching frequency $f_{DD}$ of the DC-DC converter 15 ($f_{DD} \times n$) is larger than the frequency $f_r$ determined based on the upper limit of the detection range of the radar as shown in a signal spectral drawing (NO. 3) of FIGS. 5A and 5B. Therefore, in either case, it is prevented to output the erroneous information.

Figure 2A:
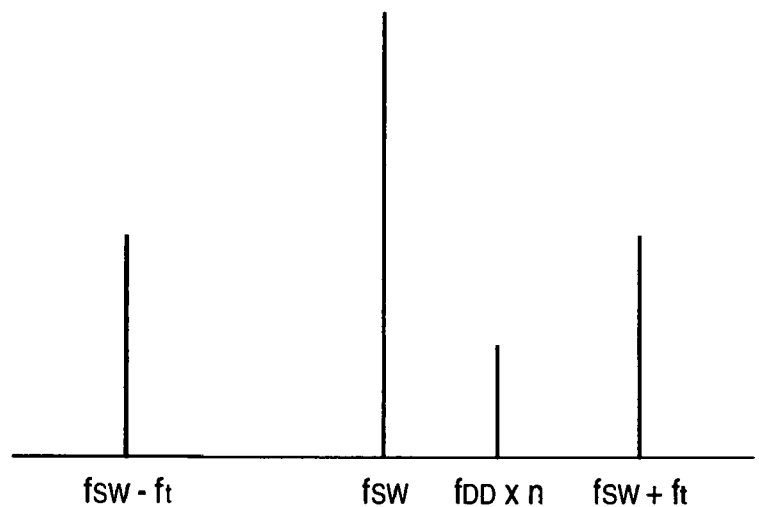
FIGS. 2A and 2B are signal spectral drawings (No. 1)
Figure 2B:
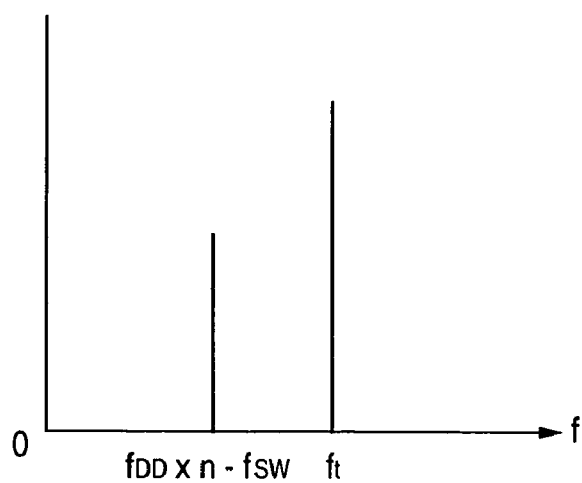

If the signal line connecting the local oscillator 112 and the DC-DC converter 15 is broken, etc., the local oscillation frequency of the local oscillator 112 and the switching. frequency of the DC-DC converter 15 are out of synchronization with each other. In such an asynchronous state, the DC-DC converter 15 free runs at a preset frequency. Thus, a noise spectrum (difference frequency $f_{DD} \times n - f_{SW}$) as shown in FIG. 2B occurs.

However, if the radar does not detect that the asynchronous state occurs, the radar cannot recognize it as a noise spectrum and further cannot discriminate the noise from an information signal based on the reflected wave from the object.

Although the frequency at which the DC-DC converter 15 free runs is preset, the noise spectrum maybe shifted in order of 100 kHz due to the environment difference such as temperatures, characteristic variations in parts or the like. Thus, the position (frequency) of the noise spectrum cannot previously be determined. Since there is a possibility that an information signal may exist accidentally at the position of the noise spectrum, it is also impossible to previously determine the position of the noise spectrum and treats all spectrums at that position as noise.

In this embodiment, using at least one of anomaly detection methods described below, the anomaly detection section 18 detects an asynchronous state, that is, the local oscillator 112 and the DC-DC converter 15 (abnormal state) are out of synchronous with each other to determine the presence of a noise spectrum. To detect the abnormal state, the mode is switched into a failure detection mode different from a normal mode. Specifically, the failure detection mode is inserted at regular time intervals or at random during the operation in the normal mode and the presence or absence of an anomaly is checked. The anomaly detection section 18 is implemented as a CPU that executes a program for conducting any of the anomaly detection methods according to the embodiment, for example.

Figure 6:
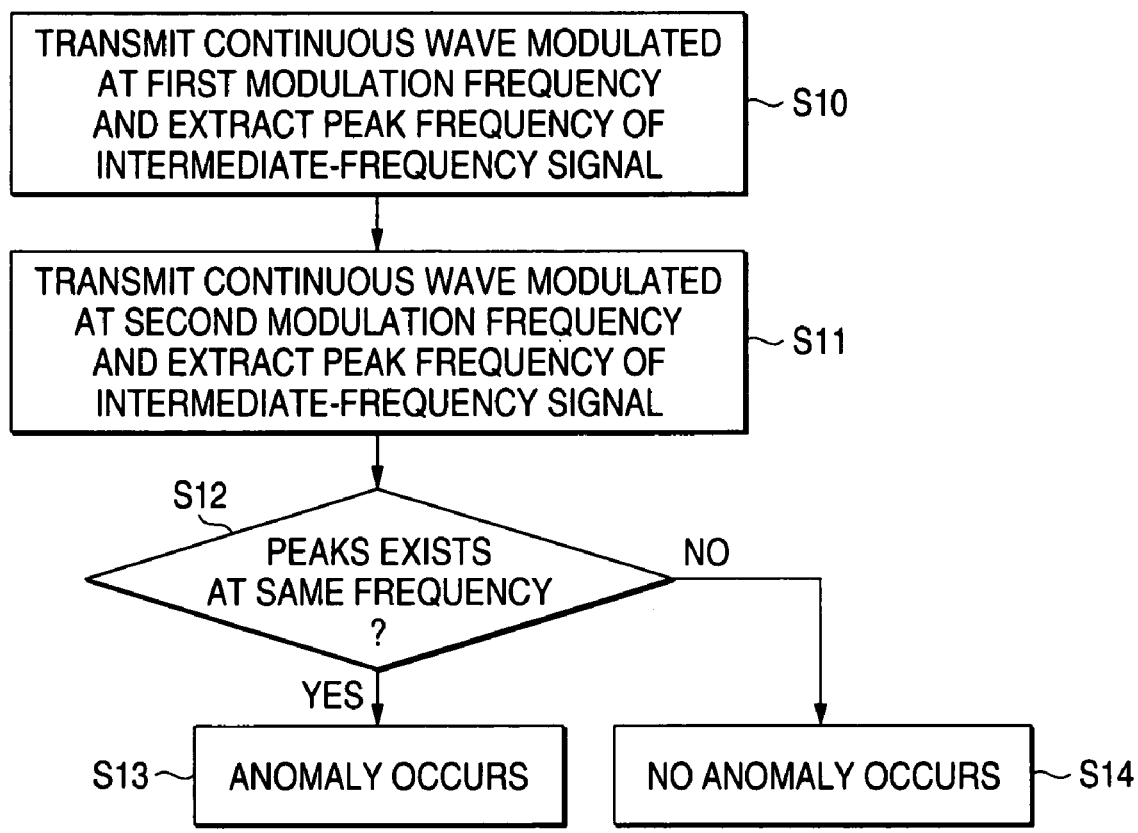
FIG. 6 is a processing flowchart of a first anomaly detection method according to the embodiment of the invention.

FIG. 6 is a processing flowchart of a first anomaly detection method according to this embodiment. In the first anomaly detection method, FM modulation frequency is changed to transmit plural kinds of continuous waves modulated at different FM modulation frequencies. If a peak at a certain frequency, which exists in the signal spectrum of intermediate-frequency signal before the FM modulation frequency is changed, still exists in the signal spectrum of intermediate-frequency signal after the FM modulation frequency is changed, it is recognized as an anomaly and the peak frequency is recognized as a noise spectrum (peak frequency caused by the free-run operation of the DC-DC converter 15).

Specifically, a first continuous wave modulated at a first preset FM modulation frequency is transmitted and a peak frequency in the signal spectrum of the intermediate-frequency signal, which is obtained based on a reflected wave, is extracted (S10). A plurality of peak frequencies may exist.

Subsequently, a second continuous wave modulated at a second FM modulation frequency different from the first FM modulation frequency is transmitted and a peak frequency in the signal spectrum of the intermediate-frequency signal, which obtained based on a reflected wave, is extracted (S11).

A comparison is made between the peak frequency, which is obtained based on the first FM modulation frequency, and the peak frequency, which is obtained based on the second FM modulation frequency, and whether or not the peaks exist at the same frequency is determined (S12).

As the FM modulation frequency is changed, the peak frequency, which is obtained based on the reflected wave from the object, also changes. However, the peak frequency caused by the free run operation of the DC-DC converter does not depend on the FM modulation frequency. Therefore, even if the FM modulation frequency is changed, the position of the peak frequency caused by the free run operation does not change.

Accordingly, if the peaks exist at the same frequency at step S12, the peak is a peak frequency caused by the free run operation. Thus, it is determined that an anomaly occurs (S13); if the peaks don't exist at the same frequency, it is determined that no anomaly occurs (S14).

Figure 7:
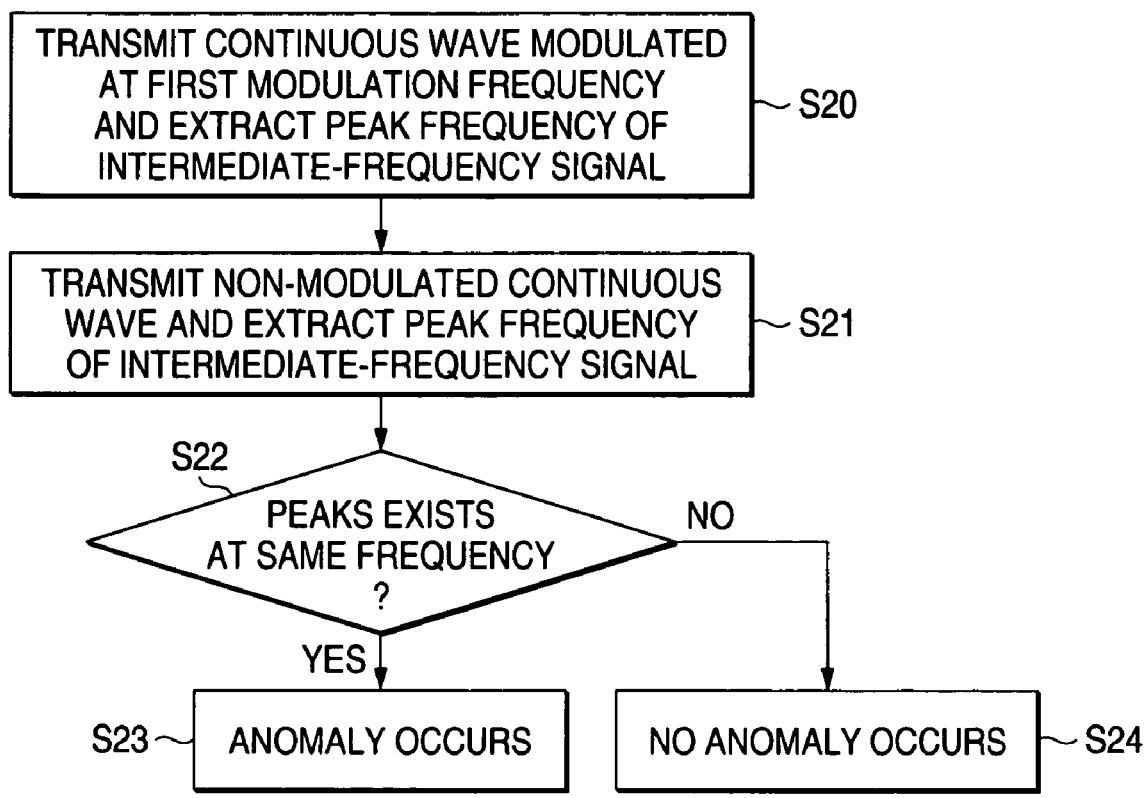
FIG. 7 is a processing flowchart of a second anomaly detection method according to the embodiment of the invention.

FIG. 7 is a processing flowchart of a second anomaly detection method according to this embodiment. In the second anomaly detection method, for example, transmission of a continuous wave in an FM-CW mode is changed to transmission of a continuous wave in a mode in which modulation is not executed, such as a CW mode. If a peak at a certain frequency, which exists in a signal spectrum of the intermediate-frequency signal before the transmission of the continuous wave in the FM-CW mode is changed, still exits in the signal spectrum of the intermediate-frequency signal after the FM-CW mode is changed to the CW mode, it is recognized as an anomaly and the peak frequency is recognized as a noise spectrum (peak frequency caused by the free run operation of the DC-DC converter 15).

Specifically, a first continuous wave modulated at a first preset FM modulation frequency is transmitted and a peak frequencyin the signal spectrum of the intermediate-frequency signal, which is obtained based on a reflected wave, is extracted (S20). A plurality of peak frequencies may exist.

Subsequently, the modulation using the first FM modulation frequency is stopped. A not-modulated continuous wave in the CW mode in which modulation is not executed is transmitted and a peak frequency in the signal spectrum of the intermediate-frequency signal, which is obtained based on a reflected wave, is extracted (S21).

A comparison is made between the peak frequency, which is based on the modulated continuous wave, and the peak frequency, which is obtained based on the not-modulated continuous wave, and whether or not the peaks exist at the same frequency is determined (S22).

The peak frequency, which is obtained based on the reflected wave from the object, also changes depending on whether or not the continuous wave is modulated. However, the peak frequency caused by the free run operation of the DC-DC converter 15 does not depend on whether or not the continuous wave is modulated. Therefore, even if modulation of the continuous wave is stopped, the position of the peak frequency caused by the free run operation does not change.

Accordingly, if the peaks exist at the same frequency at step S22, the peak is a peak frequency caused by the free run operation. Thus, it is determined that an anomaly occurs (S23). If the peaks don't exist at the same frequency, it is determined that no anomaly occurs (S24).

Figure 8:
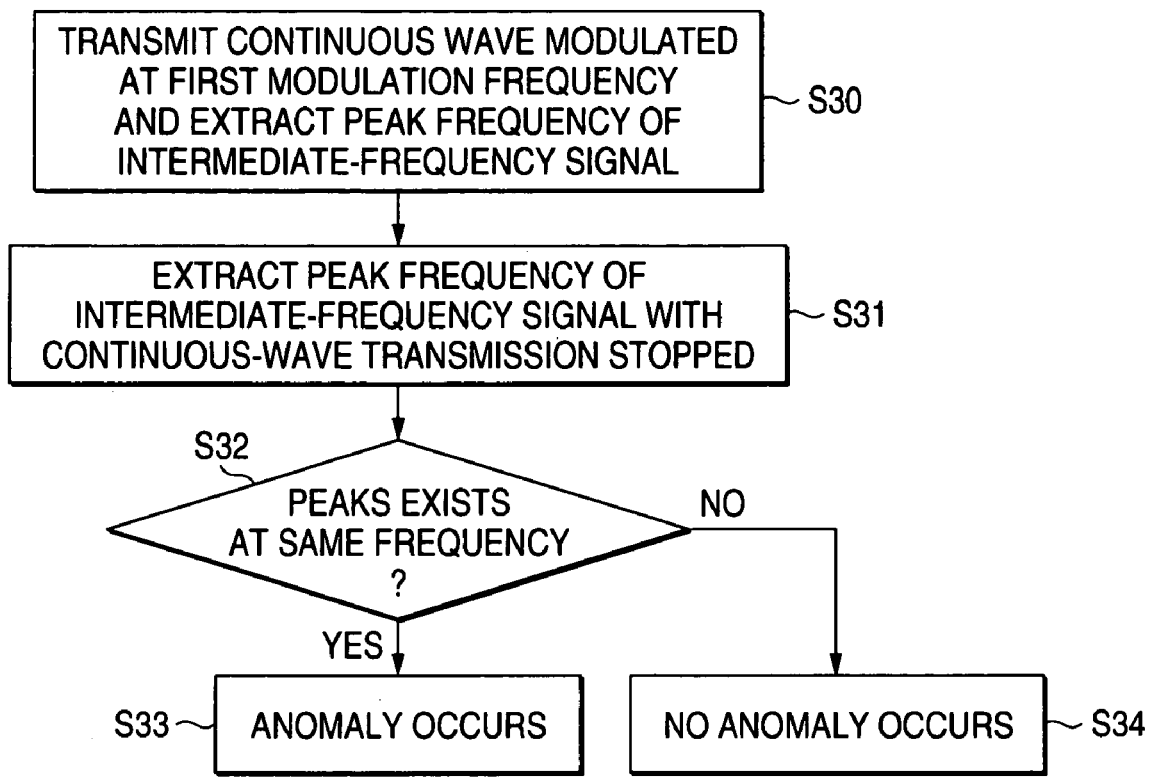
FIG. 8 is a processing flowchart of a third anomaly detection method according to the embodiment of the invention.

FIG. 8 is a processing flowchart of a third anomaly detection method according to this embodiment. In the third anomaly detection method, transmission of a continuous wave is stopped. If a peak at a certain frequency, which exists in a signal spectrum of intermediate-frequency signal before the transmission of the continuous wave is stopped, still exists in the signal spectrum of intermediate-frequency signal after the transmission of the continuous wave is stopped, it is recognized as an anomaly and the peak frequency isrecognized as a noise spectrum (peak frequency caused by the free run operation of the DC-DC converter 15).

Specifically, a first continuous wave modulated at a first preset FM modulation frequency is transmitted and a peak frequency in the signal spectrum of the intermediate-frequency signal, which is obtained based on a reflected wave, is extracted (S30). A plurality of peak frequencies may exist.

Subsequently, the continuous-wave transmission is stopped and a peak frequency of the signal spectrum in the intermediate-frequency signal, which is obtained in this state, is extracted (S31).

A comparison is made between the peak frequency, which is obtained when the continuous wave is being transmitted, and the peak frequency, which is obtained after the transmission of the continuous-wave is stopped, and whether or not the peaks exist at the same frequency is determined (S32).

When the transmission of the continuous wave is stopped, the peak frequency, which is obtained based on the reflected wave from the object, does not exist. However, the peak frequency caused by the free run operation of the DC-DC converter does not depend on whether the continuous wave is transmitted or the transmission of the continuation wave is stopped. Therefore, even if the continuous-wave transmission is stopped, the peak frequency caused by the free run operation exists and the position of the peak frequency does not change.

Therefore, if the peaks exist at the same frequency at step S32, the peak is the peak frequency caused by the free run operation. Thus, it is determined that an anomaly occurs (S33). If the peaks don't exist at the same frequency, it is determined that no anomaly occurs (S34).

The first, second, and third anomaly detection methods described above may be executed in combination. For example, a position of a peak frequency, which is obtained based on the continuous wave modulated at the first modulation frequency, a position of a peak frequency, which is obtained based on the continuous wave modulated at the second modulation frequency, and a position of a peak frequency, which is obtained based on a not-modulated continuous wave may be compared. Then, whether or not the peaks exist at the same frequency may be determined.

Figure 9:
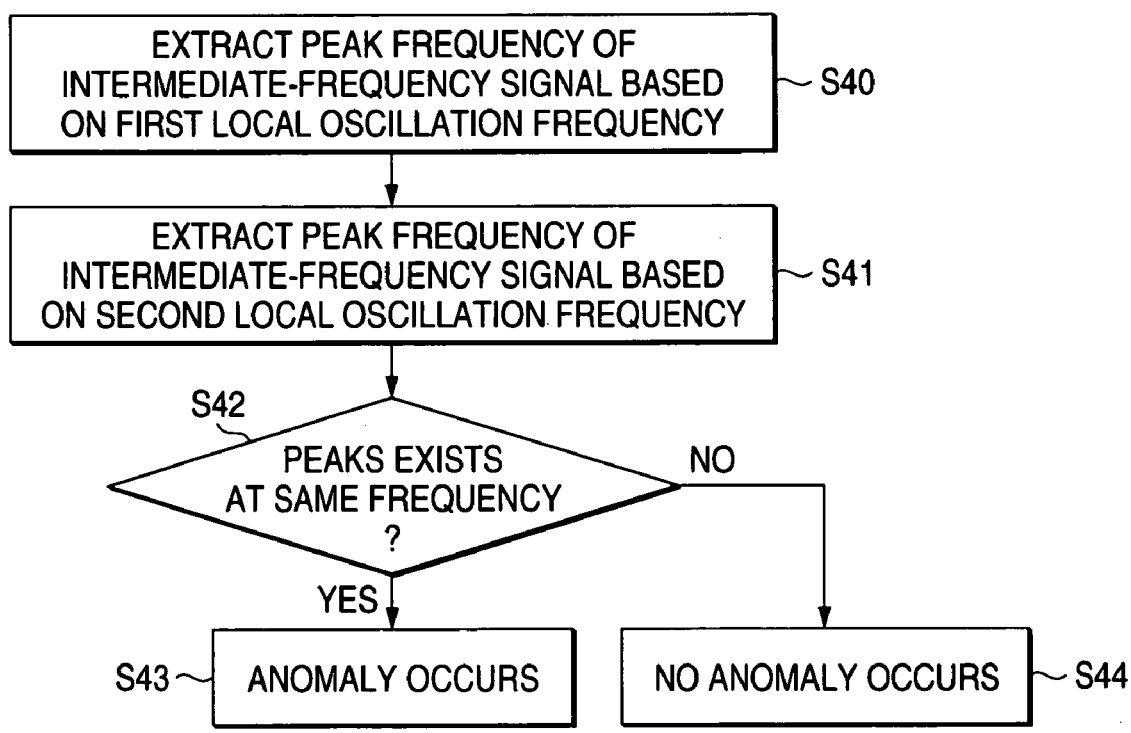
FIG. 9 is a processing flowchart of a fourth anomaly detection method according to the embodiment of the invention.

FIG. 9 is a processing flowchart of a fourth anomaly detection method according to this embodiment. In the fourth anomaly detection method, the transmission wave is not changed, but the local oscillation frequency of the local oscillator 112 is changed. If a peak at a certain frequency, which exists in a signal spectrum of intermediate-frequency signal before the local oscillation frequency of the local oscillator 112 is changed, still exits after the local oscillation frequency of the local oscillator 112 is changed, it is recognized as an anomaly and the peak frequency is recognized as a noise spectrum (peak frequency caused by the free run operation of the DC-DC converter 15).

Specifically, the peak frequency in the signal spectrum of the intermediate-frequency signal, which is obtained based on a first preset local oscillation frequency, is extracted (S40).

Subsequently, the local oscillation frequency of the local oscillator 112 is changed to a second local oscillation frequency. Then, a peak frequency in the signal spectrum of the intermediate-frequency signal, which is obtained based on the second local oscillation frequency different from the first local oscillation frequency, is extracted (S41).

A comparison is made between the peak frequency, which is obtained based on the first local oscillation frequency, and the peak frequency, which is obtained based on the second local oscillation frequency, and whether or not the peaks exist at the same frequency is determined (S42).

As the local oscillation frequency is changed, the intermediate frequency also changes. However, the peak frequency caused by the free run operation of the DC-DC converter does not depend on the local oscillation frequency. Therefore, if the local oscillation frequency is changed, the position of the peak frequency caused by the free run operation does not change.

Accordingly, if the peaks exist at the same frequency at step S42, the peak is the peak frequency caused by the free run operation and thus, it is determined that an anomaly occurs (S43). If the peaks don't exist at the same frequency, it is determined that no anomaly occurs (S44).

Figure 10:
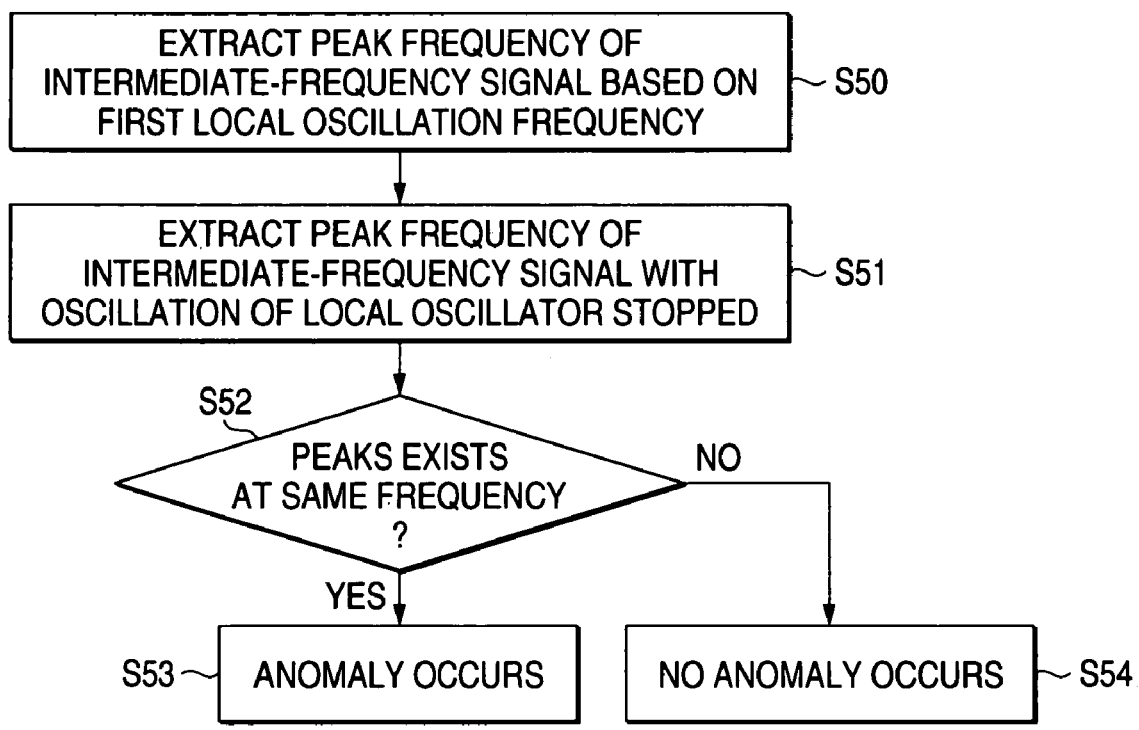
FIG. 10 is a processing flowchart of a fifth anomaly detection method according to the embodiment of the invention.

FIG. 10 is a processing flowchart of a fifth anomaly detection method according to this embodiment. In the fifth anomaly detection method, oscillation of the local oscillator 112 is stopped. If a peak at a certain frequency, which exists in a signal spectrum of intermediate-frequency signal before the oscillation of the local oscillator 112 is stopped, still exists after the oscillation of the local oscillator 112 is stopped, it is recognized as an anomaly and the peak frequency is recognized as a noise spectrum.

Specifically, the peak frequency in the signal spectrum of the intermediate-frequency signal, which is obtained based on a first preset local oscillation frequency, is extracted (S50).

Subsequently, oscillation of the local oscillator 112 is stopped. Then, a peak frequency in the signal spectrum of the intermediate-frequency signal, which is obtained in this state, is extracted (S51).

A comparison is made between the peak frequency, which is obtained when the local oscillator 112 oscillating, and the peak frequency, which is obtained when the oscillation of the local oscillator 112 is stopped, and whether or not the peaks exist at the same frequency is determined (S52).

The peak frequency caused by the free run operation of the DC-DC converter 15 does not depend on whether the local oscillator 112 oscillates or the oscillation of the local oscillator 112 is stopped. Therefore, even if the oscillation of the local oscillator 112 is stopped, the peak frequency caused by the free run operation exists and the position of the peak frequency does not change.

Accordingly, if the peaks exist at the same frequency at step S52, the peak is the peak frequency caused by the free run operation and thus, it is determined that an anomaly occurs (S53). If the peaks don't exist at the same frequency, it is determined that no anomaly occurs (S54).

Figure 11:
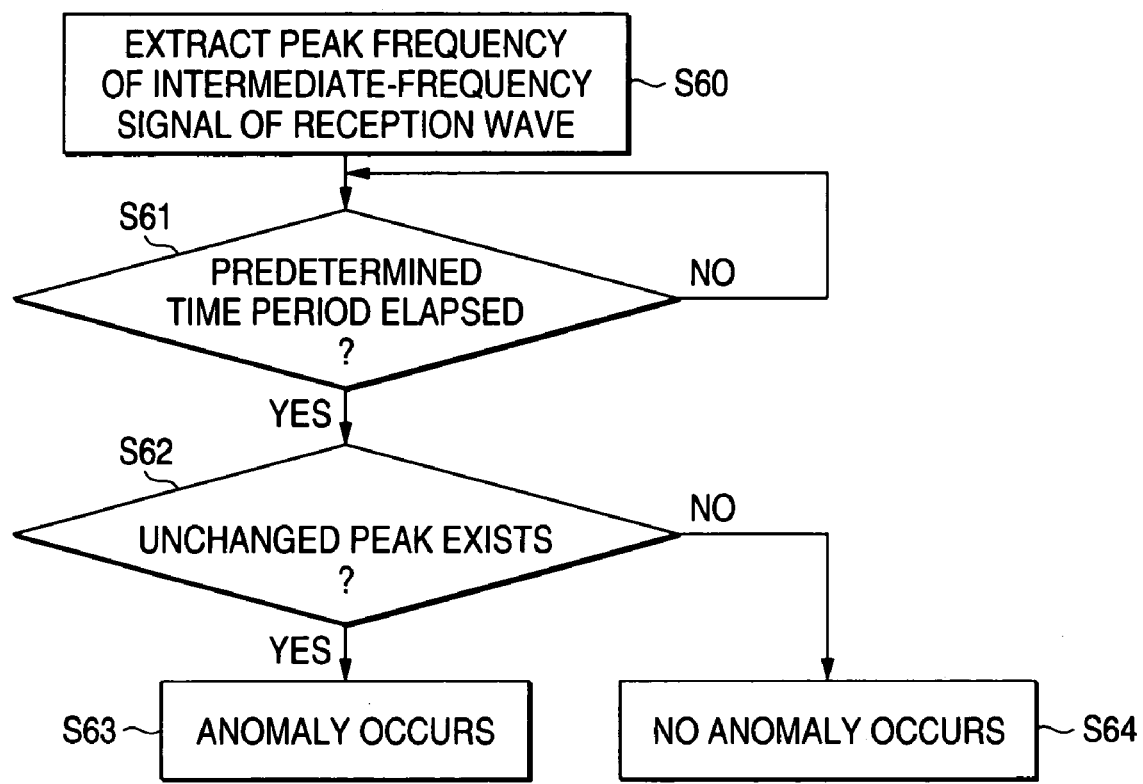
FIG. 11 is a processing flowchart of a sixth anomaly detection method according to the embodiment of the invention.

FIG. 11 is a processing flowchart of a sixth anomaly detection method according to this embodiment. In the sixth anomaly detection method, when a peak frequency, which does not change for a predetermined time period, exists, it is recognized as an anomaly and the peak frequency is recognized as a noise spectrum.

In an FM (–CW) radar, peak frequencies derived from targets change every moment depending on a distance to each target and a relative speed between the radar and each target. In contrast, a peak remaining at the same frequency means that a distance to a particular target does not change. However, it is less likely that the distance to the particular target does not change for a long time period when the vehicle is running. Therefore, a peak frequency, which does not change for a given time period while a vehicle is running can be determined as a noise spectrum caused by free run operation.

In this case, the vehicle speed may be detected to change a threshold time-period used in determining anomaly detection. For example, when the vehicle runs at high speed, the determination time period may be shortened. Anomaly may be detected by detecting that a peak frequency does not change although the vehicle speed changes or a steering wheel is turned. For example, the vehicle speed can be detected by a speed sensor or an engine speed sensor provided in a wheel. To detect change in the vehicle speed, a differentiation value between sensor output values may be used or operation of an accelerator, or a brake may be monitored directly. Further, turning the steering wheel can be detected using a steering sensor. Of course, any other device may be used so long as it can detect movement of a vehicle directly or indirectly.

In FIG. 11, a peak frequency in the signal spectrum of the intermediate-frequency signal is extracted (S60). A plurality of extracted peak frequencies may exist. After the expiration of a predetermined time period (S61), whether there is an extracted peak frequency, which does not change, is detected. Then, whether or not the peak remaining at the same frequency exists is determined (S62).

If the peak remaining at the same frequency exists at step S62, the peak frequency is caused by the free run operation and thus, it is determined that an anomaly occurs (S63). If the peak remaining at the same frequency does not exist, it is determined that no anomaly occurs (S64).

If an anomaly is detected by any of the above-mentioned anomaly detection methods executed in the anomaly detection mode, namely, a certain peak frequency existing in an output signal of the reception section before a transmission state is changed still exists in the output signal of the reception section after the transmission state is changed, such a peak frequency is recognized as a noise spectrum in the normal mode. The frequency signal is canceled and the signal processing is continued.

The peak frequency determined as a noise spectrum may be canceled, for example, by the following method. If the anomaly detection section 18 detects an anomaly (e.g., the DC-DC converter 15 and the local oscillator 112 are out of synchronization with each other), the peak frequency caused by the DC-DC converter 15, which is the detected noise spectrum, and the strength of the peak frequency are stored in memory of the data processing section 12 as a correction value. Thereafter, the correction value is subtracted from the frequency spectrum provided by FFT, whereby the peak frequency derived from the DC-DC converter can be canceled.

The correction value may be updated on a regular basis. In doing so, if the free run frequency of the DC-DC converter 15 drifts due to temperature change, etc., an unnecessary peak can be canceled correctly following the free run frequency drift.

What is claimed is:

1. A radar comprising:
a transmission section that emits a transmission wave to a target;
a heterodyne reception section that receives a reflected wave from the target;
a power supply section that supplies power to the heterodyne reception section, a switching frequency of the power supply section being in synchronized with a local oscillation frequency of the heterodyne reception section; and
a detection section that determines that the switching frequency loses synchronization with the local oscillation frequency when a certain peak frequency existing in an output signal of the reception section before a transmission state of the transmission section is changed still exists in the output signal of the reception section after the transmission state of the transmission section is changed.

2. The radar according to claim 1, wherein the detection section determines that the switching frequency loses synchronization with the local oscillation frequency, when the certain peak frequency existing in the output signal of the reception section before a modulation frequency of the transmission wave is changed still exists in the output signal of the reception section after the modulation frequency of the transmission wave is changed.

3. The radar according to claim 1, wherein the detection section determines that the switching frequency loses synchronization with the local oscillation frequency when the certain peak frequency existing in the output signal of the reception section before the transmission section stops modulating the transmission wave still exists in the output signal of the reception section after the transmission section stops modulating the transmission wave.

4. The radar according to claim 1, wherein the detection section determines that the switching frequency loses synchronization with the local oscillation frequency when the certain peak frequency existing in the output signal of the reception section before the transmission section stops emitting the transmission wave still exists in the output signal of the reception section after the transmission section stops emitting the transmission wave.

5. The radar according to claim 1, further comprising:
a data processing section that detects the target based on the output signal of the reception section, wherein:
when the detection section determines that the switching frequency loses synchronization with the local oscillation frequency, the data processing section detects the target while canceling the certain peak frequency existing in the output signal of the reception section.

6. The radar according to claim 5, wherein:
when the detection section determines that the switching frequency loses synchronization with the local oscillation frequency, the detection section stores data including (i) a value of the certain peak frequency and (ii) an intensity of the certain peak frequency existing in the output signal of the reception section, into the data processing section, and
the data processing section detects the target while canceling the certain peak frequency existing in the output signal of the reception section based on the stored data.

7. A radar comprising:
a heterodyne reception section that receives a reflected wave from a target;

a power supply section that supplies power to the heterodyne reception section, a switching frequency of the power supply section being synchronized with the local oscillation frequency; and a detection section that determines that the switching frequency loses synchronization with the local oscillation frequency, when a certain peak frequency, which exists in an output signal of the heterodyne reception section before the local oscillation frequency is changed or stopped without changing the switching frequency, still exists in the output signal of the heterodyne reception section after the local oscillation frequency is changed or stopped without changing the switching frequency.

8. The radar according to claim 7, further comprising:

a data processing section that detects the target based on the output signal of the reception section, wherein:

when the detection section determines that the switching frequency loses synchronization with the local oscillation frequency, the data processing section detects the target while canceling the certain peak frequency existing in the output signal of the reception section.

9. The radar according to claim 8, wherein:

when the detection section determines that the switching frequency loses synchronization with the local oscillation frequency, the detection section stores data including (i) a value of the certain peak frequency and (ii) an intensity of the certain peak frequency existing in the output signal of the reception section, into the data processing section, and the data processing section detects the target while canceling the certain peak frequency existing in the output signal of the reception section based on the stored data.

10. A radar comprising:

a heterodyne reception section that receives a reflected wave from a target;

a power supply section that supplies power to the heterodyne reception section, a switching frequency of the power supply section being synchronized with the local oscillation frequency; and a detection section that determines that the switching frequency loses synchronization with the local oscillation frequency when a certain peak frequency has existed in an output signal of the heterodyne reception section over a predetermined time period.

11. The radar according to claim 10, further comprising:

a data processing section that detects the target based on the output signal of the reception section, wherein:

when the detection section determines that the switching frequency loses synchronization with the local oscillation frequency, the data processing section detects the target while canceling the certain peak frequency existing in the output signal of the reception section.

12. The radar according to claim 11, wherein:

when the detection section determines that the switching frequency loses synchronization with the local oscillation frequency, the detection section stores data including (i) a value of the certain peak frequency and (ii) an intensity of the certain peak frequency existing in the output signal of the reception section, into the data processing section, and the data processing section detects the target while canceling the certain peak frequency existing in the output signal of the reception section based on the stored data.

* * * * *